US007849575B2

(12) United States Patent
Hume et al.

(10) Patent No.: US 7,849,575 B2
(45) Date of Patent: Dec. 14, 2010

(54) SEAL REMOVAL TOOL AND METHOD

(75) Inventors: Timothy Hume, Orange, CA (US); Hubert Q. Stedman, Santa Ana, CA (US)

(73) Assignee: Schlem Products, Inc., Anaheim, CA (US)

( * ) Notice: Subject to any disclaimer, the term of this patent is extended or adjusted under 35 U.S.C. 154(b) by 502 days.

(21) Appl. No.: 11/858,524

(22) Filed: Sep. 20, 2007

(65) Prior Publication Data

US 2009/0077783 A1 Mar. 26, 2009

(51) Int. Cl.
*B23P 19/04* (2006.01)

(52) U.S. Cl. .......................................... 29/263; 29/235

(58) Field of Classification Search ................... 29/335, 29/426, 258, 263, 426.1, 426.5
See application file for complete search history.

(56) References Cited

U.S. PATENT DOCUMENTS 2,614,318 A * 10/1952 McCord ...................... 29/263
2,646,619 A * 7/1953 McCord ...................... 29/263
3,611,540 A * 10/1971 Gibu ........................... 29/263
4,507,837 A * 4/1985 Hinkle ........................ 29/262
5,692,282 A * 12/1997 Baca ........................... 29/235
5,709,018 A * 1/1998 Dugan ......................... 29/235
6,065,198 A * 5/2000 Vitous et al. .................. 29/258

OTHER PUBLICATIONS

Cover page of SP Tools, Schley Products, Inc. Specialty Automotive Hand Tools, Catalog 20071, p. 9 GM Transmissiona Seal Removal And Installation Tools Part No. 93480.

* cited by examiner

*Primary Examiner*—David P Bryant
*Assistant Examiner*—Jacob J Cigna
(74) *Attorney, Agent, or Firm*—John J. Connors; Connors & Assoc.

(57) ABSTRACT

A seal removal tool includes a hollow cylindrical member, an advancing device, and a extracting device. The cylindrical member has an open, circular first end with a barbed knife-edge that has a perimeter with a diameter substantially equal to an inside diameter of an inner circular edge of an annular seal fitting snuggly around an exposed end of a shaft. A second end of the cylindrical member is partially closed with an enlarged threaded opening therein. The advancing device comprises a first threaded elongated rod element and a pressing portion for pressing against the partially closed second end. The extracting device comprises a second threaded elongated rod element having an enlarged tip for engaging the exposed end of the shaft after disengaging the advancing device. The enlarged tip is configured to screw into an enlarged threaded opening in the cylindrical member and to advance axially and press against the exposed end of the shaft as the second threaded elongated rod element is rotated.

16 Claims, 5 Drawing Sheets

SEAL REMOVAL TOOL AND METHOD

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "shaft" means a rotating or reciprocating rod or like structure for the transmission of motive power in a mechanical device.

BACKGROUND

Mechanical devices with flush or protruding shafts frequently use an annular fluid seal surrounding an end of the shaft. A portion of the seal is seated snugly within a recess in a bearing surrounding and supporting the shaft. At the end of many shafts is a threaded cavity for a bolt used to hold an implement to this end, For example, the implement may be a sprocket, pulley, shaft coupling, shaft balancer, or other component of the mechanical device.

The seal prevents leaking of internal fluids to the exterior of the mechanical device, and such a seal needs to be periodically removed and replaced, as it hardens and breakdowns over time, ceasing to function properly, so fluid leakage occurs. These shaft fluid seals are made of a supple material, but may include a steel reinforcing ring. The internal diameter of the seal is such so that the inner annular edge of the seal presses tightly against and around the shaft forming a barrier. Nevertheless, the seal is seated and mounted in a manner that enables the shaft to move, either to rotate or reciprocate, or both.

The seal barrier prevents fluids from flowing to the exterior of the mechanical device through the interface between the shaft sidewall and the edge of the seal abutting this sidewall. Conventional removal of seals is accomplished using a metal or plastic pick. The pick is manually slid in one direction along the shaft and under the inner seal edge, catching the edge, and then pulling on the seal in the opposite direction to deform and remove the seal. Using a pick accelerates shaft wear and sometimes causes damage to the shaft, resulting in loss of sealing properties if the shaft is worn or damaged by gouging or scratching.

SUMMARY

Our tool has one or more of the features depicted in the embodiment discussed in the section entitled "DETAILED DESCRIPTION OF ONE ILLUSTRATIVE EMBODIMENT." The claims that follow define our tool and method of use, distinguishing them from the prior art; however, without limiting the scope of our tool and method of use as expressed by these claims, in general terms, some, but not necessarily all, of their features are:

One, the seal removal tool includes a cup element, for example, a hollow cylindrical member having first and second opposed ends. The first end is open with a circular perimeter constituting a knife-edge, and this perimeter has a diameter substantially equal to an inside diameter of an inner circular edge of the annular seal being removed. The second end has therein an enlarged threaded opening having a diameter greater than a predetermined diameter of a cavity in the face of the shaft into which a bolt is screwed to hold an implement to the shaft's end.

Two, the knife-edge may be continuous (360°) along the entire perimeter and it may be offset slightly from the shaft to avoid scoring of the shaft. The knife-edge may be barbed and configured to provide an inner and outer truncated substantially conical surfaces that meet at or near the perimeter. These surfaces are inclined from the perimeter away from each other and function as ramps that facilitate cutting and bending the seal during its removal. For example, their inclined or tapering surfaces diverge away from the perimeter, and may form a wedge portion expanding radially from the circular perimeter and slanting towards the cylinder member's second end to form the ramps. of the outer one of the truncated substantially conical surfaces. The wedge portion may terminate in a continuous, circumferential, and circular rear ledge that abuts and engages an inside surface of the seal's inner circular edge when the knife edge has deflected the seal and moved between the shaft and the seal's inner circular edge so that ledge can now grip the seal. An outer cylindrical surface portion may be immediately adjacent the perimeter and it has its axis co-extensive with a longitudinal axis of the shaft as the cylindrical member advances to cut into the seal. This outer cylindrical surface portion extends a short distance from the perimeter to an inner end Three, a detachable advancing device for the cup element is configured to pass through the enlarged threaded opening. This advancing device may comprise a first threaded elongated rod element and a pressing element for pressing against the partially closed second end. The first rod element has a diameter that is less than the diameter of the enlarged threaded opening to enable the first rod element to pass freely through the enlarged threaded opening and be screwed into the threaded cavity in the face of the shaft's end. Thus, as the advancing device is rotated in a first direction to advance axially, the pressing element bears against the second end of the cup element to move it inward and force the knife-edge against the annular seal near the inner circular edge of the seal until the knife-edge deflects the seal and moves inward past the seal's inner circular edge and between the shaft and the inner circular edge. Rotation of the first rod element in a second direction opposite the first direction detaches it from the cylindrical member while leaving the ledge grasping the inner edge of the seal.

Four, after detaching the advancing device, a detachable extracting device is used to pull the seal off the end of the shaft. The extracting device may comprise a second threaded elongated rod element having an enlarged tip for engaging the exposed end or face of the shaft. The enlarged tip is configured to screw into the enlarged threaded opening and to advance axially and press against the exposed end or face of the shaft as the second threaded elongated rod element is rotated. This action moves the cylindrical member away from the exposed end of the shaft so the barbed knife edge, specifically the ledge, grips the seal's inner circular edge and pulls the seal away from the shaft as the second threaded elongated rod element is rotated.

Five, because of the axial alignment of the shaft, cup element, advancing device, and extracting device during seal removal, the manner in which our tool is used is almost self-explanatory and very little instruction is required to begin immediately using our tool in accordance with our method.

Our method is uniquely suited to remove a seal from an end of a shaft. A typical seal may comprise an elastomeric material having embedded therein an annular metal element having a substantially L-shaped cross-section including an annular lip member that is substantially at a right angle to a longitudinal axis of the shaft. Our method includes the steps of (a) positioning on the end of the shaft a hollow cylindrical member having an open first end into which the end of the shaft is inserted and a second end opposite the first end, the first end having a perimeter comprising a circular knife-edge and rearward of the knife-edge a gripping member, said circular knife-edge having a diameter substantially equal to an inside diameter of the annular lip member, (b) advancing the cylindrical member toward the seal, forcing the knife-edge to cut through the elastomeric material and bend the lip member inward until said knife-edge passes beneath the lip member so that a portion of the lip member and the gripping member engage without the cylindrical member making any substantial contact with the shaft, and (c) extracting the cylindrical member while the portion of the lip member and the gripping member are engaged, thereby moving the cylindrical member away from the end of the shaft to pull the seal away from the shaft.

These features are not listed in any rank order nor is this list intended to be exhaustive.

DESCRIPTION OF THE DRAWING

One embodiment of our tool and method are discussed in detail in connection with the accompanying drawing, which is for illustrative purposes only. This drawing includes the following figures (Figs.), with like numerals indicating like parts.

DETAILED DESCRIPTION OF ONE ILLUSTRATIVE EMBODIMENT

Figure 1:
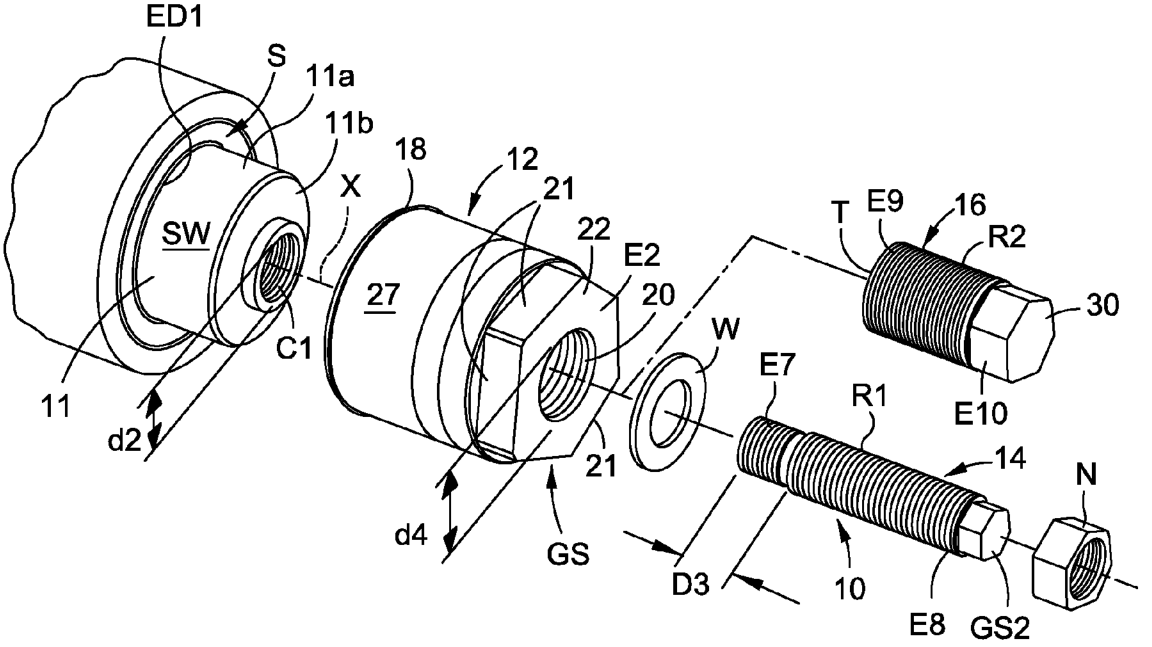
FIG. 1 is an exploded perspective view of one embodiment of our tool.
Figure 2:
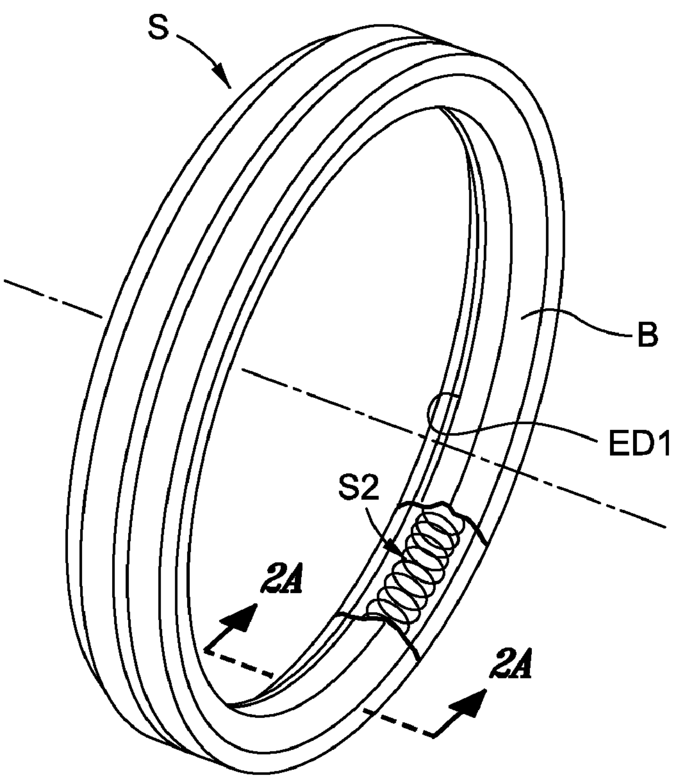
FIG. 2 is a perspective view of an example of the general type of the seal that is removed using our tool.
Figure 2A:
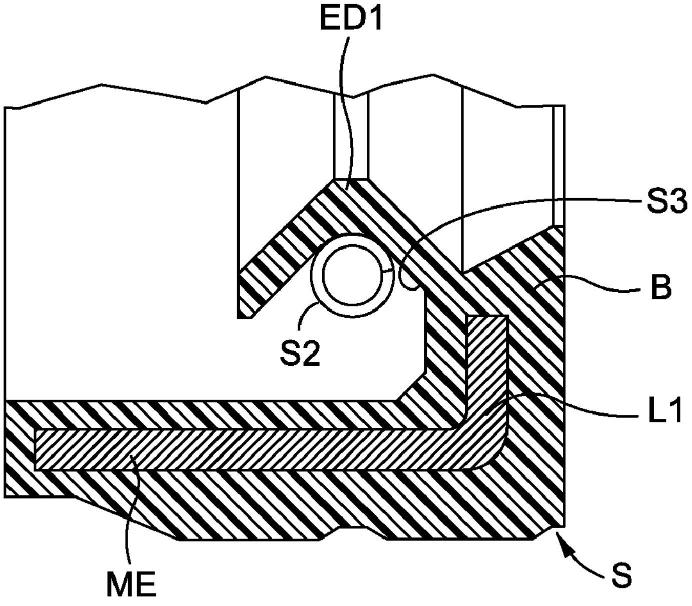
FIG. 2A is a cross-sectional view taken along line 2A-2A if FIG. 2.
Figure 3:
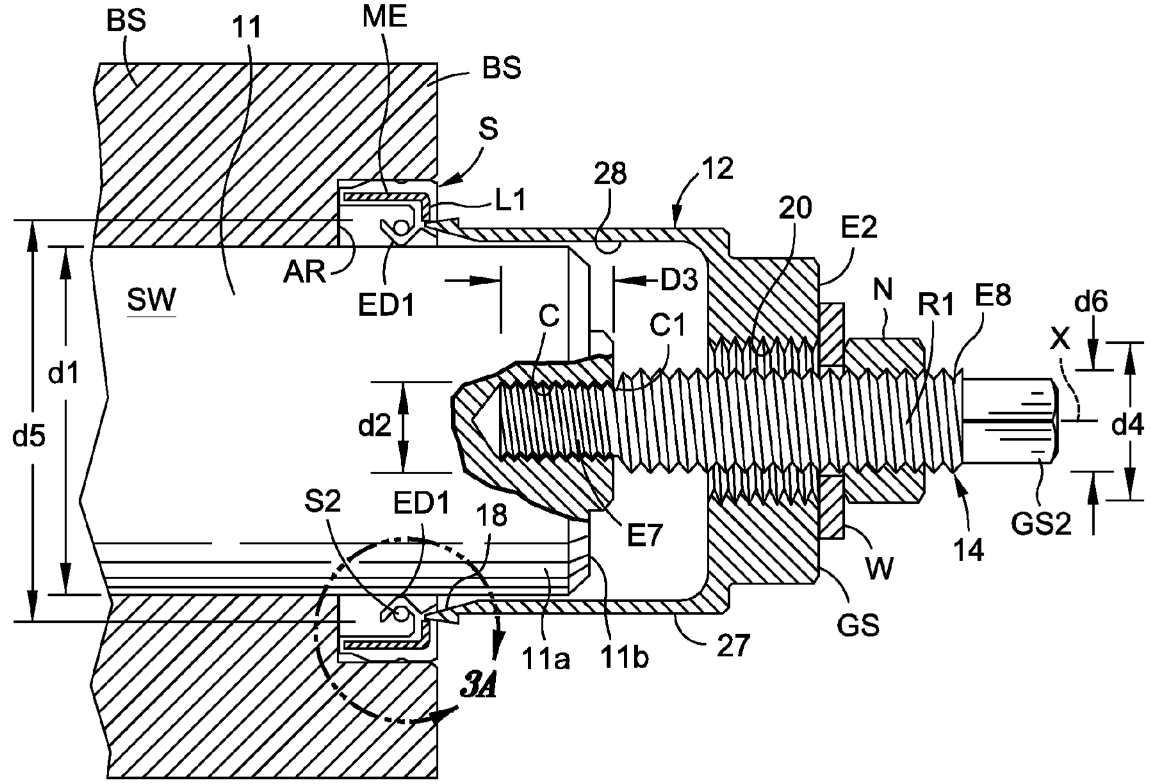
FIG. 3 is a cross-sectional view showing the cup element of our tool and its advancing device assembled positioned on the end of a shaft.

Our tool may be used to remove a commonly used seal S mounted on an end 11*a* of a shaft 11, and it is generally designated by the number 10 (FIG. 1). As illustrated best in FIGS. 2 and 2A, the seal S has an annular body B made of an elastomeric material such as, for example, rubber, that has embedded therein an annular metal element ME. The annular metal element ME has a substantially L-shaped cross-section including an annular lip member L1 that is substantially at a right angle to a longitudinal axis X of the shaft 11 when the seal S is mounted on the shaft in the conventional manner as shown in FIG. 3. The seal S has a circular inner edge ED1 with a diameter d1 substantially from 0.50 to 5 inches. The shaft end 11*a* projects from a bearing structure BS that includes an annular recess AR surrounding the shaft 11. The seal S is pushed through an open front of the annular recess AR, and the seal fits snugly within the recess and its circular inner edge ED1 abuts the exterior sidewall SW of the shaft 11. A portion of the seal's rear end may be pressed against a back of the recess AR. An annular coiled spring S2 lodged within an annular indentation S3 (FIG. 2A) in the body B of the seal S holds the circular inner edge ED1 firmly against the exterior sidewall SW of the shaft 11 inward from a face 11*b* (FIG. 1) of the shaft at the end 11*a*. As best shown in FIG. 1, this face 11*b* has therein an open end C1 of an axially oriented threaded cavity C best shown in FIG. 3. The diameter d2 of the cavity C is substantially from 0.312 to 0.630 inch.

Figure 4:
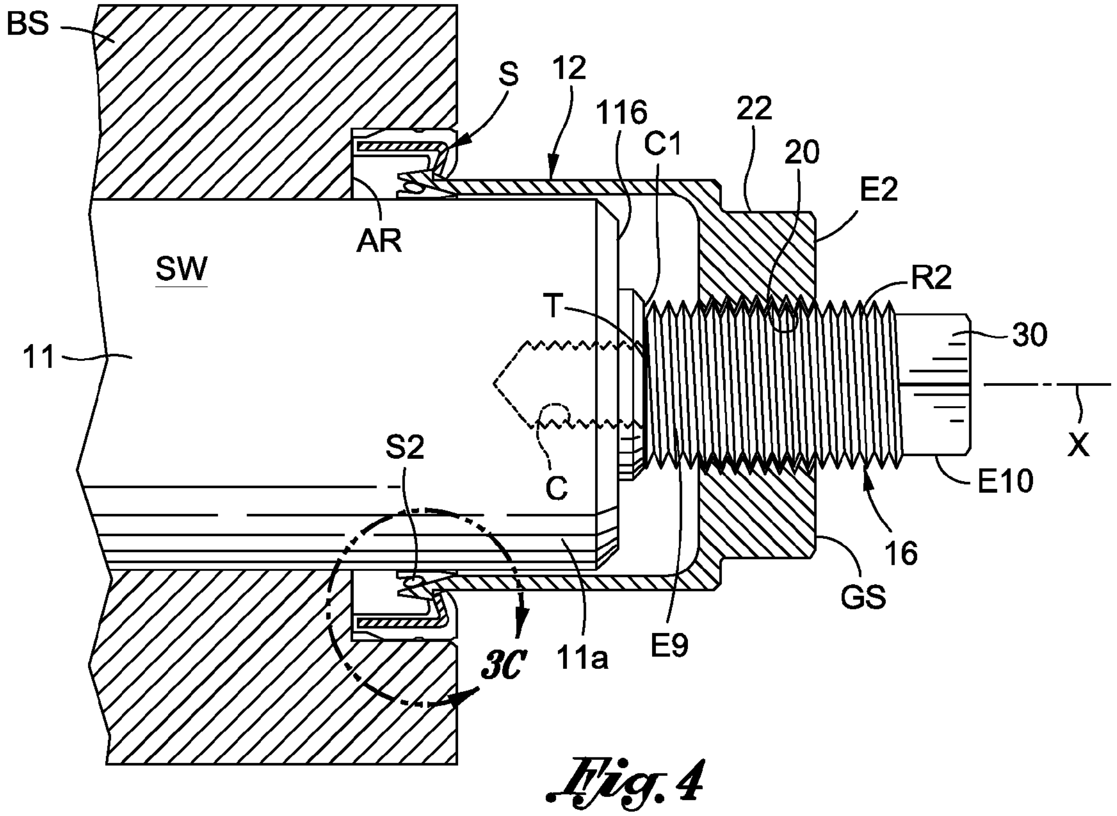
FIG. 4 is a cross-sectional view showing the cup element and its extracting device assembled and positioned on the end of a shaft.
Figure 5:
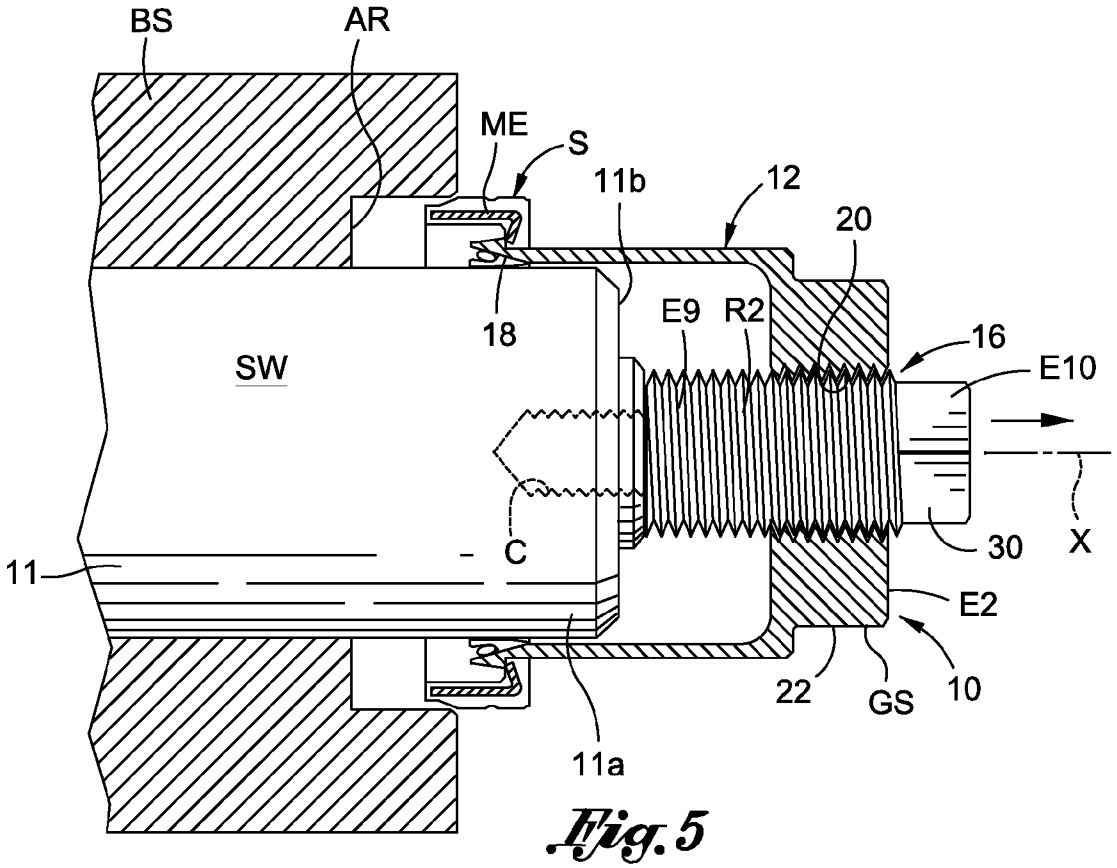
FIG. 5 is a cross-sectional view similar to that of FIG. 4 showing the extracting device pulling the cup element and the seal held thereby off the end of the shaft.

As illustrated in FIG. 1, our tool 10 includes an advancing device 14, an extracting device 16, and a cup element, for example, a hollow cylindrical member 12, configured to be positioned on the end 11*a* of the shaft 11 when the seal S is to be removed. Both the advancing device 14 and extracting device 16 are each adapted to be detachably mounted to the cylindrical member 12. As illustrated in FIG. 3, the advancing device 14 is first mounted on the cylindrical member 12 and also connected to the shaft 11. The advancing device 14 is then manually manipulated to move the cylindrical member 12 axially inward to grip the seal S. The advancing device 14 is then detached and, as illustrated in FIGS. 4 and 5, the extracting device 16 is connected to the cylindrical member 12, which is then moved axially outward by the extracting device so the cylindrical member 12 as it grips the seal S is pulled off the end 11*a* of the shaft 11.

Figure 1A:
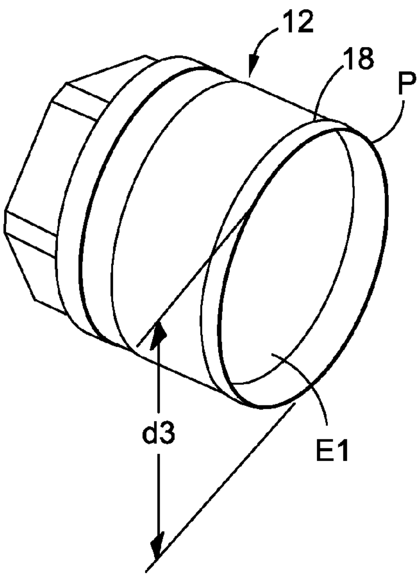
FIG. 1A is a perspective view of the cup element of our tool looking into its open end.

The cylindrical member 12 is made of metal such as, for example, 4140 chromoly steel, and is formed by machining a block of the metal. It has an open distal end E1 (FIG. 1A) that fits over and covers the end 11*a* of the shaft 11 when the seal S is being removed and a proximal end E2 (FIG. 1) opposite the open end E1. The open end E1 has a perimeter P comprising a circular knife-edge 18 with a diameter d3 substantially equal to the inside diameter d5 (FIGS. 1 and 3) of the annular lip member L1. The proximal end E2 has an enlarged threaded opening 20 therein having a diameter d4 (FIG. 3), which is greater than the diameter d2 of the cavity C. Near or at the partially closed end E2 is a gripping structure GS that enables the cylindrical member 12 to be held by a griping tool, for example, a wrench or pliers, that prevents rotation of the cylindrical member as the extracting device 16 in combination with the cylindrical member pulls the seal S from the end 11*a* of the shaft 11. This gripping structure may be opposed, spaced parallel flat surfaces 21 suitable for grasping with a wrench or pliers, for example, the built-in hex-nut 22 depicted.

Figure 3A:
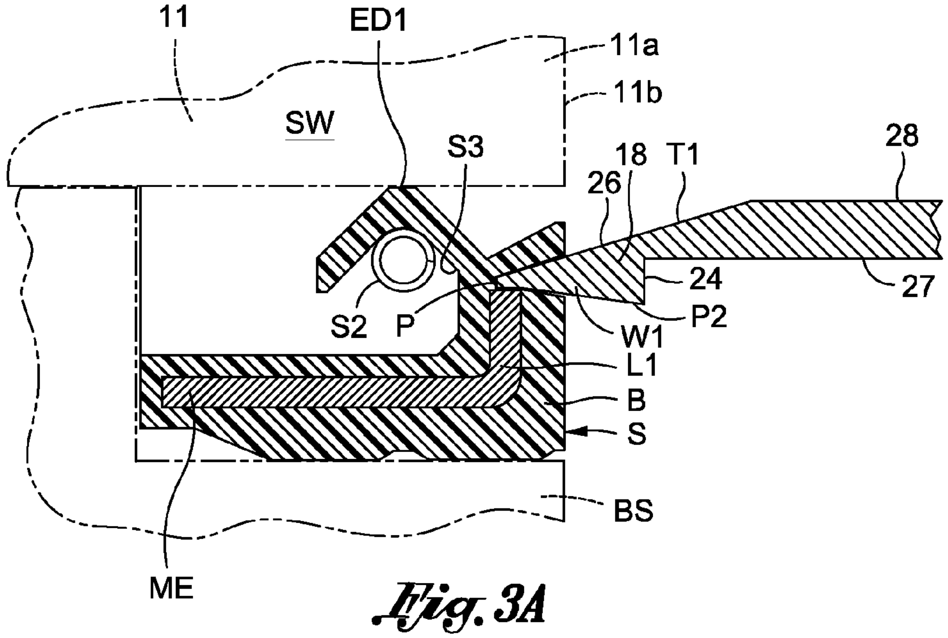
FIG. 3A is an enlarged, fragmentary cross-section view taken along line 3A of FIG. 3, showing the knife edge of the cup element initially being advanced to cut into a seal on the end of the shaft.
Figure 3B:
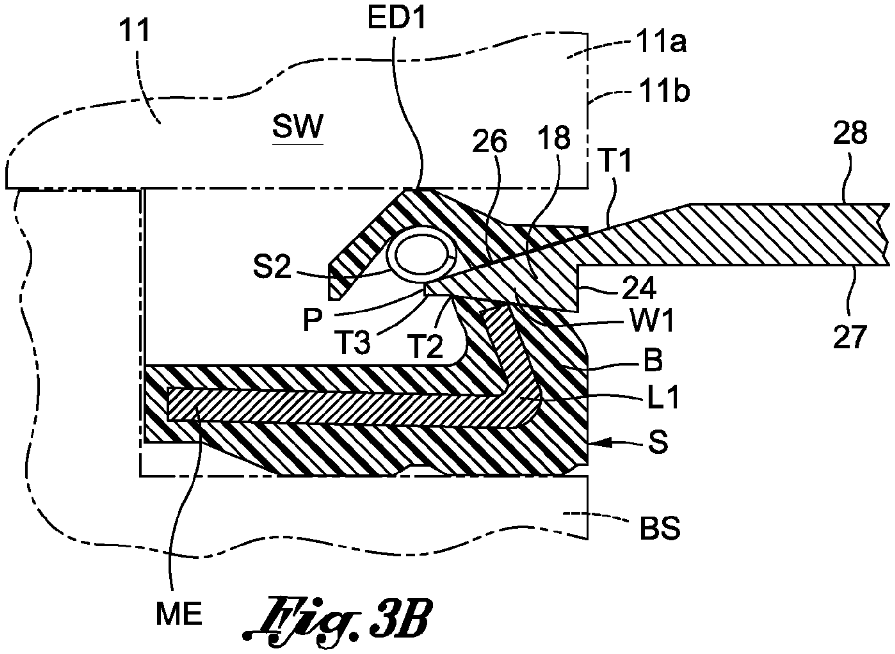
FIG. 3B is an enlarged, fragmentary cross-section view similar to that of FIG. 3A showing the knife-edge advanced to bend a portion of a metallic ring seated within the seal.
Figure 3C:
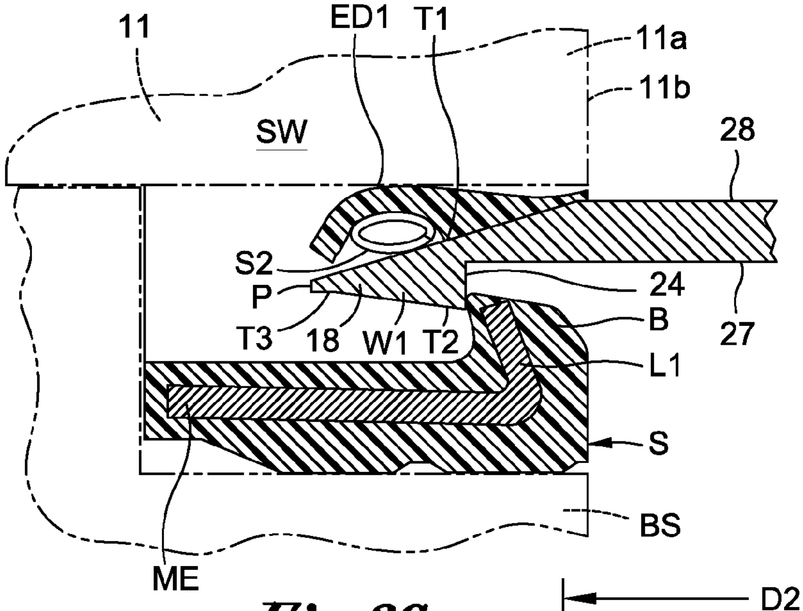
FIG. 3C is an enlarged, fragmentary cross-section view taken along line 3C of FIG. 4 showing a lip member of the seal griping a ledge adjacent the knife-edge after this edge deflects the seal and moves inward past the seal's inner circular edge and between the shaft and the inner circular edge.
Figure 3D:
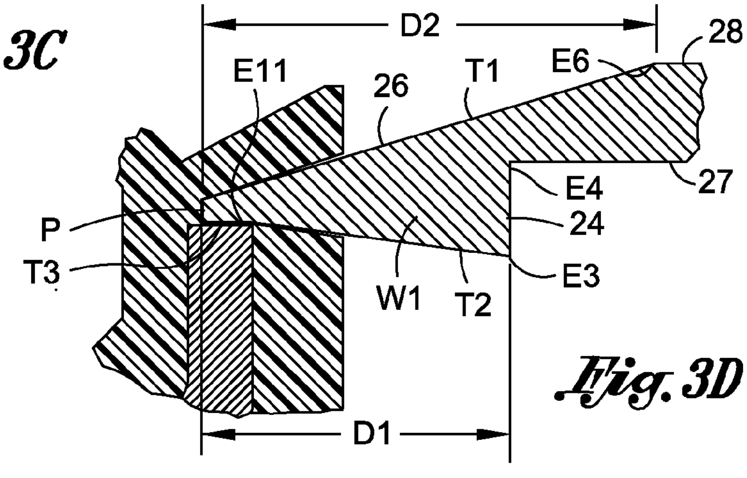
FIG. 3D is an enlarged, fragmentary cross-section view of the barbed knife cutting into the seal.

The knife-edge 18 is barbed and continuous along the entire perimeter P of the open end E1. As best shown in FIGS. 3A through 3D, it comprises a pair of substantially truncated conical surfaces T1 and T2 and a short (about 0.015 inch) cylindrical surface portion T3 extending from the perimeter P to a distal end E11 of the surface T2. The cylindrical surface portion T3 is immediately adjacent the perimeter P and its axis is co-extensive with the longitudinal axis X of the shaft 11 as the cylindrical member 12 advances to cut into the seal S. As best shown in FIG. 3D, the cylindrical surface portion T3 facilitates properly aligning the knife-edge 18 with the lip member L1 and bending the lip member as the cylindrical member 12 advances. The pair of truncated conical surfaces T1 and T2 form a pair of outwardly diverging conical ramps. The one conical surface T2 provides an outer tapered wedge portion W1 that expands outward radially from the circular perimeter P and slants towards the proximal end E2 at an angle substantially from 5 to 25 degrees with respect to the axis X. As best illustrated in FIG. 3D, this wedge portion W1 terminates in a circular, rearward, circumferential ledge 24. The ledge 24 has one end E3 at the inward end of the tapering annular or conical surface T2 and the other end E4 at an outer cylindrical wall 27 of the cylindrical member 12. The distance D1 (FIG. 3D) from the perimeter P to the ledge 24 is substantially from 0.050 to 0.150 inch. The other annular surface T1 forms an underside 26 of the outer tapered wedge portion W1 that expands inward radially and slants outwardly from the circular perimeter P towards the distal end E2 at an angle substantially from 10 to 25 degrees with respect to the axis X. The distance D2 that this underside 26 extends from the perimeter P to an inner wall 28 of the cylindrical member 12 is substantially from 0.050 to 0.275 inch. The distance D2 is greater than the distance D1. The underside 26 contracts inward radially and slants outwardly from the perimeter P towards the distal end E2.

The barbed knife-edge 18 thus includes a circumferential ramp, namely, the conical surface T2, that slopes outward, extending from a leading cutting portion of knife-edge coextensive with the perimeter P of the open end E1 and terminating at the ledge 24. The knife-edge 18, ledge 24 and ramp, or conical surface T2, may all be continuous. The knife-edge 18 and the inner wall 28 are offset slightly from the exterior sidewall SW of the shaft 11 to avoid scoring or other damage to the shaft. This offset dimension usually is substantially from 0.005 to 0.125 inch and is precisely controlled so the knife-edge 18 and inner wall 28, or any other part of the cylindrical member 12, do not touch the exterior sidewall SW of the shaft 11 in a manner that would damage the sidewall as the seal S is being removed.

The advancing device 14 may include a threaded elongated rod element R1 that extends through a washer W. As depicted in FIG. 3, one free end E7 of the rod element R1 has a reduced diameter extending along the length of the rod element a distance D3 corresponding approximately to the depth of the cavity C. Consequently, this free end E7 bottoms out when screwed in the cavity C of the shaft 11, but cannot continued to be rotated after bottoming out. The free end E7 is inserted through the enlarged threaded opening 20 in the partially closed end E2 of the cylindrical member 12 and screwed into the threaded cavity C.

The washer W, which functions as the pressing element, is slid over the other free end E8 of the rod element R1 and placed against the partially closed end E2. Usually after thus attaching the rod element R1 to the shaft 11 and placing the washer W on the rod element, a nut N is threaded onto the free end E8 and tightened. This free end E8 may also include a gripping structure GS2, for example a built-in hex-nut, for a gripping tool such as, for example, a wrench or pliers. This enables the rod element R1 and nut N to be rotated independent of each other so the free end E7 may be screwed into the cavity C using a wrench or pliers to grasp the gripping structure GS2 to rotated the rod element. The rod element R1 has the reduced diameter at its end E7 and a larger diameter d6 at its end E8, which are both less than the diameter d4 of the enlarged threaded opening 20, enabling the rod element to pass freely through the enlarged threaded opening and be screwed into the threaded cavity C by rotation in a first direction, for example, clockwise. Consequently, as the nut N is tightened about the rod element R1 that has been screwed into the cavity C, the washer W bears against the partially closed end E2 to move the cylindrical member 12 inward and force the knife-edge 18 to cut through the elastomeric material as depicted in FIG. 3A. Typically, the user uses a wrench to tighten the nut N. As the assembly of the washer W and nut N advances inward to press the cylindrical member 12 against the seal S, the ramp, or tapering annular surface T2, is pushed against the lip member L1 to bend it inward as depicted in FIG. 3B.

The outside diameter of the knife-edge 18, that is, its perimeter P, may be slightly less than, or slightly greater than, the inside diameter d1 of the lip member L1. If slightly greater then, the knife-edge 18 first contacts the lip member L1 and bends it inward, and then the ramp, or conical surface T2, engages the lip member and slides beneath it. If slightly less than, the knife-edge 18 first slides beneath the lip member L1 and then progressive portions of ramp, or conical surface T2, engage the lip member and bend it inward. When the entire ramp, or conical surface T2, clears the lip member L1, the lip member has enough resiliency to flex outward a sufficient distance so that a portion of the lip member grips the ledge 24 as shown in FIGS. 3C and 4. Continued rotation of the nut N bearing against the washer W is unnecessary; however, such continued rotation of the nut would eventually bring the knife-edge 18 into contact with the back of the recess AR. The advancing device 14 is now detached by rotation of the rod element R1 in an opposite direction, for example, counterclockwise using for example a wrench to grasp the gripping structure GS2 at the free end E8 and turn the rod element, removing it and the washer W and nut N, so the enlarged opening 20 may be accessed by the extracting device 16.

As depicted in FIG. 4, the extracting device 16 may also include a threaded elongated rod element R2 having an enlarged tip T at one end E9 and a built-in hex-nut 30 at its opposite end E10. After detaching the advancing device 14 from the cylindrical member 12, the threaded elongated rod element R2 is screwed into the enlarged threaded opening 20, for example, using a wrench to grip the built-in hex-nut 30 to rotate the rod element R2 clockwise. The enlarged tip T is configured to screw into the enlarged threaded opening 20 and to advance axially and press against the exposed face 11*b* of the shaft 11 as the rod element R2 is rotated. Continuing such clockwise rotation of the rod element R2 moves the cylindrical member 12 along the exposed end 11*a* of the shaft 11, concurrently pulling the seal S away from the shaft 11. A wrench may be used simultaneously to grip the built-in hex-nut 22 on the cylindrical member 12 so the cylindrical member 12 is prevented from rotating as it is withdrawn from the end 11*a* of the shaft 11.

Method of Use

After removing an attached implement from the end 11*a* of the shaft 11 to expose the threaded cavity C in the shaft's face 11*b*, the cup element or cylindrical member 12 is placed on the shaft's end. Usually the advancing rod element R1 is first screwed into the cavity C as discussed above in connection with FIG. 3 and then the cup element or cylindrical member 12 is placed on the rod element, sliding the end E8 of the rod element through the opening 20 in the cup element and bringing the knife edge 18 into contact with the seal S, centering or axially aligning the shaft's axis X with the cavity C, seal S, cylinder member or cup element 12, but not touching the sidewall SW of the shaft 11. Then the washer W is placed over the rod element R1 and up against the built-in hex-nut 22.

Finally, the nut N is threaded onto the end E8 of the rod element R1 finger tight up against the washer W. Upon verifying that the barbed knife edge 18 is centered on the shaft S and not touching the shaft 11, holding the cup element 12 stationary, and using a wrench to tighten the nut N, the barbed knife edge 18 is thrust into the seal S, flexing the lip member L1 of the metal element ME and advancing the knife edge past the seal's inner edge ED1 until the ledge 24 grips the seal as shown in FIG. 3C. Once the barbed knife edge 18 has been pushed through the seal S by rotation of the nut N, the assembled rod element R1, washer W and nut N are removed and the extracting rod element R2 is screwed into the cavity C using a wrench to turn this extracting rod element. As the extracting rod element R2 turns, its enlarged tip T presses against the face 11*b* of the shaft 11. This forces the cup element 12 to move away from the shaft face 11*b* to pull the seal S from the annular recess AR retaining the seal.

CONCLUSION

Our tool 10 is easy to manufacture and use, including readily available components that serve as the advancing and extracting devices. The uniquely configured cylindrical member 12 eliminates damaging of the sidewall SW of the shaft 11. Consequently, when the removed seal S is replaced, leakage is avoided. Our tool (1) essentially eliminates any damage to a sidewall of the shaft when removing the seal therefrom, (2) enables the user conveniently to access and remove seals, (3) can access a confined area, in many cases avoiding considerable disassembly of an engine, and (4) and does not damage threads of the cavity for a shaft bolt that holds an implement to the end of the shaft. Our tool is manually manipulated for easy use, and has a continuous 360 degree knife edge that may be barbed and may have a low-profile insertion ability to give maximum surface area penetration without shaft damage. The components of our tool are low cost, and simple to manufacture and assemble. With minimum instruction, a user can begin using our tool immediately. By pressing the knife edge into the seal to grasp it, the seal is manually pulled from the shaft. As this knife edge is forced into the seal, it collapses the imbedded seal steel support ring, sliding under the seal's inner edge allowing barbed portion or ledge to grip firmly this edge when pulling the seal from the seal's recess in the mechanical device.

SCOPE OF THE INVENTION

The above presents a description of the best mode we contemplate of our tool, and of the manner and process of making and using it, in such full, clear, concise, and exact terms as to enable any person skilled in the art to which it pertains to make and use our tool. Our tool is, however, susceptible to modifications and alternate constructions from the illustrative embodiment discussed above which are fully equivalent. Consequently, it is not the intention to limit our tool to the particular embodiment disclosed. On the contrary, our intention is to cover all modifications and alternate constructions coming within the spirit and scope of our tool as generally expressed by the following claims, which particularly point out and distinctly claim the subject matter of our invention:

The invention claimed is:

1. A seal removal tool comprising a cup element having first and second opposed ends, the first end being open with a circular perimeter and a barbed knife-edge thereat, said perimeter having a diameter substantially equal to an inside diameter of an inner circular edge of an annular seal that fits snuggly around an exposed end of a shaft having therein an axially oriented threaded cavity with a predetermined diameter, the second end being partially closed with an enlarged threaded opening therein having a diameter greater than the predetermined diameter of the cavity, an advancing device for the cup element comprising a first threaded elongated rod element and a pressing element for pressing against the partially closed second end, said first rod element having a diameter that is less than the diameter of the enlarged threaded opening to enable said first rod element to pass freely through the enlarged threaded opening and be screwed into the threaded cavity so that, as the advancing device is rotated in a first direction, the pressing element bears against the second end to move the cup element inward and force the barbed knife-edge against the annular seal near the inner circular edge of the seal until the barbed knife-edge deflects the seal and moves inward past the seal's inner circular edge and between the shaft and the inner circular edge, and a extracting device comprising a second threaded elongated rod element having an enlarged tip for engaging the exposed end of the shaft after disengaging the advancing device by rotation in a second direction opposite the first direction, said enlarged tip configured to screw into the enlarged threaded opening and to advance axially and press against the exposed end of the shaft as the second threaded elongated rod element is rotated, thereby moving the cup element away from the exposed end of the shaft so the barbed edge grips the seal's inner circular edge and pulls said seal away from the shaft.

2. The tool of claim 1 where the barbed knife-edge is continuous along the entire perimeter.

3. The tool of claim 1 where the barbed knife-edge is offset slightly from the shaft to avoid scoring of the shaft.

4. The tool of claim 1 where the barbed knife-edge comprises an inner and outer truncated substantially conical surfaces.

5. The tool of claim 4 including forward of an edge of the outer conical surface a substantially cylindrical surface portion extending from the perimeter to said edge.

6. The tool of claim 1 including a wedge portion that expands outward radially from the perimeter and slants towards the second end and terminates in a rear ledge that abuts and engages an inside surface of the seal's inner circular edge when the barbed edge has deflected the seal and moved between the shaft and said inner circular edge.

7. The tool of claim 6 where the wedge portion includes a substantially conical underside surface that contracts inward radially and slants outwardly from the circular perimeter towards the second end.

8. The tool of claim 7 where the wedge portion slants towards the second end a first predetermined distance and the underside slants towards the second end a second predetermined distance that is greater than said first predetermined distance.

9. A tool for removing a seal from an end of a shaft, said seal comprising an elastomeric material having embedded therein an annular metal element having a substantially L-shaped cross-section including a lip member that is substantially at a right angle to a longitudinal axis of the shaft, said tool comprising a cylindrical member having at one end a circular knife-edge, said cylindrical member being configured for positioning on the end of the shaft when the seal is to be removed, a circumferential ledge on an exterior of the cylindrical member, a circumferential ramp that slopes outward extending between the knife-edge and the ledge, and an advancing device that is detachably mounted to the cylindrical member for moving the cylindrical member axially into engagement with the seal, so the knife-edge cuts through the elastomeric material and the ramp bends the lip member inward and passes beneath said lip member, said lip member flexing outward a sufficient distance so that a portion of the lip member grips the ledge upon the ramp passing beneath the lip member, and where the advancing device comprises a threaded elongated rod element and a pressing element for pressing against an end of the cylindrical member opposite the knife-edge when the threaded elongated rod element is screwed into a threaded cavity in the end of the shaft.

10. A tool for removing a seal from an end of a shaft, said seal comprising an elastomeric material having embedded therein an annular metal element having a substantially L-shaped cross-section including a lip member that is substantially at a right angle to a longitudinal axis of the shaft, said tool comprising a cylindrical member having at one end a circular knife-edge, said cylindrical member being configured for positioning on the end of the shaft when the seal is to be removed, a circumferential ledge on an exterior of the cylindrical member, a circumferential ramp that slopes outward extending between the knife-edge and the ledge, and an advancing device that is detachably mounted to the cylindrical member for moving the cylindrical member axially into engagement with the seal, so the knife-edge cuts through the elastomeric material and the ramp bends the lip member inward and passes beneath said lip member, said lip member flexing outward a sufficient distance so that a portion of the lip member grips the ledge upon the ramp passing beneath the lip member, and a seal extracting device that is detachably mounted to the cylindrical member for removing the seal from the end of the shaft concurrent with the lip member gripping the ledge, and where the advancing device is detached from the cylindrical member prior to the seal extracting device being attached to the cylindrical member.

11. The tool of claim 10 where the seal extracting device comprises a threaded elongated rod element having an enlarged tip for engaging the exposed end of the shaft, said enlarged tip configured to screw into an enlarged threaded opening in an end of the cylindrical member opposite the knife-edge.

12. A tool for removing a seal from an end of a shaft having therein an axially oriented threaded cavity with a predetermined diameter, said seal comprising an elastomeric material having embedded therein an annular metal element having a substantially L-shaped cross-section including an annular lip member that is substantially at a right angle to a longitudinal axis of the shaft, said tool comprising a hollow cylindrical member configured to be positioned on the end of the shaft when the seal is to be removed, said cylindrical member having an open first end into which the end of the shaft is inserted when the seal is being removed and a second end opposite the first end, said first end having a perimeter comprising a circular knife-edge with a diameter substantially equal to an inside diameter of the annular lip member, said second end being partially closed with an enlarged threaded opening therein having a diameter greater than the predetermined diameter of the cavity in the end of the shaft, a circumferential ledge on an exterior of the cylindrical member, a circumferential ramp that slopes outward extending between the knife-edge and the ledge, and an advancing device for the cylindrical member comprising a first threaded elongated rod element and a pressing element for pressing against the partially closed second end when the first threaded elongated rod element has been inserted into and through the opening in the second end and screwed into the threaded cavity in the shaft, said first rod element having a diameter that is less than the diameter of the enlarged threaded opening to enable said first rod element to pass through the enlarged threaded opening and be screwed into the threaded cavity so that, as the advancing device is rotated in a first direction, the pressing element bears against the second end to move the hollow cylindrical member inward and forcing the knife-edge to cut through the elastomeric material and pushing the ramp against the lip member to bend said lip member inward and then passing beneath said lip member, said lip member flexing outward a sufficient distance so that a portion of the lip member grips the ledge upon the ramp passing beneath the lip member, and a extracting device comprising a second threaded elongated rod element having an enlarged tip for engaging the exposed end of the shaft after disengaging the advancing device, said enlarged tip configured to screw into the enlarged threaded opening and to advance axially and press against the exposed end of the shaft as the second threaded elongated rod element is rotated, thereby moving the cylindrical member outwardly along the exposed end of the shaft to pull the seal away from the shaft.

13. The tool of claim 12 where the knife-edge, ledge and ramp are continuous.

14. The tool of claim 12 including a gripping structure at or near the second end that enable the cylindrical member to be held by an implement that prevents rotation of the cylindrical member as the second rod element are screwed and unscrewed into the enlarged threaded opening.

15. The tool of claim 12 where the knife-edge is offset slightly from the shaft to avoid scoring of the shaft.

16. A seal removal tool comprising a hollow cylindrical member configured to be placed on the end of a shaft carrying an annular seal, said shaft having in a terminal end a cavity therein of a predetermined diameter, said cylindrical member having a first open end and a second opposed end having therein an enlarged threaded opening having a diameter greater than the predetermined diameter of the cavity, means for forming at a perimeter of the first end a knife-edge with a gripping member rearward of the perimeter and aligned and configured to engage an inner edge of a seal surrounding an end of a shaft when the cylindrical member is placed on the end of the shaft, said knife-edge being offset slightly from the shaft to avoid scoring of the shaft, means for advancing the cylindrical member and for concurrently pressing against the second end to force the gripping member to grasp the seal, and means for extracting the seal while the gripping member grasps the seal by moving the cylindrical member along the exposed end of the shaft so the gripping member pulls said seal off the end of the shaft.

* * * * *